US007089310B1

(12) United States Patent
Ellerman et al.

(10) Patent No.: US 7,089,310 B1
(45) Date of Patent: *Aug. 8, 2006

(54) WEB-TO-PHONE ACCOUNT LINKING USING A LINKING CODE FOR ACCOUNT IDENTIFICATION

(75) Inventors: E. Castedo Ellerman, Palo Alto, CA (US); Ross B. Fubini, San Francisco, CA (US); Jeff C. Kunins, San Francisco, CA (US); Daphne H. Luong, Los Altos, CA (US); Ali Partovi, Hillsborough, CA (US); Hadi Partovi, San Francisco, CA (US); Brandon W. Porter, Mountain View, CA (US)

(73) Assignee: Tellme Networks, Inc., Mountain View, CA (US)

( * ) Notice: Subject to any disclaimer, the term of this patent is extended or adjusted under 35 U.S.C. 154(b) by 814 days.

This patent is subject to a terminal disclaimer.

(21) Appl. No.: 09/694,797

(22) Filed: Oct. 20, 2000

Related U.S. Application Data

(63) Continuation-in-part of application No. 09/592,321, filed on Jun. 13, 2000.

(51) Int. Cl.
*G06F 15/16* (2006.01)

(52) U.S. Cl. ...................... 709/227; 709/228
(58) Field of Classification Search ............ 709/227, 709/228; 713/201; 379/127.01, 88.01, 67.1, 379/93.01, 88.03
See application file for complete search history.

(56) References Cited

U.S. PATENT DOCUMENTS

| 5,694,459 | A | * | 12/1997 | Backaus et al. ....... 379/127.01 |
| 5,799,063 | A | | 8/1998 | Krane |
| 6,065,120 | A | * | 5/2000 | Laursen et al. ............. 713/201 |
| 6,154,528 | A | | 11/2000 | Bennett, III et al. |
| 6,324,579 | B1 | * | 11/2001 | Bleuse et al. ............... 709/227 |
| 6,600,736 | B1 | | 7/2003 | Ball et al. |
| 6,701,366 | B1 | * | 3/2004 | Kallas et al. ............... 709/227 |
| 6,707,811 | B1 | | 3/2004 | Greenberg et al. |
| 6,807,574 | B1 | | 10/2004 | Partovi et al. |
| 2003/0005163 | A1 | | 1/2003 | Belzile |
| 2003/0021259 | A1 | | 1/2003 | Miloslavsky et al. |

OTHER PUBLICATIONS

N. Daswani, D. Boneh, H. Gracia-Molina, S. Ketchpel, and A. Paepcke, "A generalized wallet architecture".*
Eric Ladd, Jim O'Donnell et al, "Using HTML 4, XML, and Java 1.2", Dec. 23, 1998, Que, Chapter 40.*
Laura Lemay, Rogers Cadenhead, "Teach Yourself Java 2 Platform in 21 Days", Jan. 21, 1999, Professional Reference Edition, Chapter 13.*

(Continued)

*Primary Examiner*—Le H. Luu
(74) *Attorney, Agent, or Firm*—Harrity Snyder LLP

(57) ABSTRACT

A method and apparatus for linking a web based account to a phone based account is described. The method avoids the need to directly reveal account information, e.g. username/password, about one account to the provider of the other. The linking occurs on the web in one embodiment, with a user's browser being redirected from the web site to the web site of the provider of the voice service. The redirection URL will include account linking information. Once the user identifies herself to the web site of the provider of the voice service, the linking information can be stored in the user's phone account as a cookie. When the user access the voice service over the phone, her telephone identifying information can be used to identify her profile. When she visits the phone application corresponding to the web site, the cookie—now including linking information—can be passed to the application to identify the appropriate web account.

17 Claims, 3 Drawing Sheets

OTHER PUBLICATIONS

VoxML 1.0 Language Reference, Revision 1.0a, Motorola, Inc., Oct. 1998, pp. 1-51.

VoxML 1.0 Application Development Guide, Revision 1.0, Motorola, Inc., Sep. 1998, pp. 1-31.

Motorola VoxML Team, "VoxML SDK 1.0a Interim Release Notes", Motorola, Inc., Dec. 1998, 5 pgs.

VoiceXML Forum, "Voice Extensible Markup Language—VoiceXML", Ver. 0.9, Aug. 1999, 63 pgs.

James, Frankie, "AHA: audio HTML access", Computer Networks and ISDN Systems, vol. 29 (1997), pp. 1395-1404.

James, Frankie, "Lessons from Developing Audio HTML Interfaces", Proceedings of The Third Intl. ACM Conf. on Assistive Technologies (ASSETS '98), ACM Press, Apr. 1998, pp. 27-34.

Raman, T.V., "Cascaded speech style sheets", Computer Networks and ISDN Systems, vol. 29 (1997), pp. 1377-1383.

Abrams, Marc, et al., "UIML: an appliance-independent XML user interface language", Computer Networks, vol. 31 (1999), pp. 1695-1708.

VoiceXML Forum, "Voice eXtensible Markup Language (VoiceXML)—Technical Background", copy-right AT&T (1999), printed from website "www.vxmlforum.org/tech_bkgrnd.html" Aug. 17, 1999, 3 pgs.

Cover, Robin, "The SGML/XML Web Page—Speech ML", Feb. 22, 1999, printed from website "www.oasis-open.org/cover/speechML.html " Aug. 17, 1999, 2 pgs.

Cover, Robin, "The SGML/XML Web Page—VoxML Markup Language", Mar. 2, 1999, printed from website "www.oasis-open.org/cover/speechML.html" Aug. 17, 1999, 3 pgs.

Nuance 6, product description, Nuance Communications, Menlo Park, CA, (1999), 2 pgs.

Nuance Developer's Toolkit, Nuance Communications, Menlo Park, CA, (1998), 2 pgs.

Schmandt, Chris, et al., "Augmenting a Window System with Speech Input", IEEE, Aug. 1990, pp. 50-55.

rfc2109 ("Request For Comments: 2109"), HTTP State Management Mechanism, 19 pgs.

Microsoft Corp., "Microsoft Passport Business Services: Implementation Overview," Microsoft Corp., (printed from website on Sep. 22, 2000).

Microsoft Corp., "Microsoft Passport Business Services: Frequently Asked Questions," Microsoft Corp., (printed from website on Sep. 22, 2000).

D. Kristol, Bell Laboratories, Lucent Technology, "HTTP Proxy State Management Mechanism," Nov. 1998, pp. 1-9.

* cited by examiner

WEB-TO-PHONE ACCOUNT LINKING USING A LINKING CODE FOR ACCOUNT IDENTIFICATION

RELATED APPLICATIONS

This application is a continuation-in part of U.S. patent application Ser. No. 09/592,321, entitled, "Method and Apparatus for Phone Application State Management Mechanism," filed 13 Jun. 2000, having inventors Porter, Brandon W., et. al.

BACKGROUND OF THE INVENTION

1. Field of the Invention

This invention relates to the field of account linking. In particular, the invention relates to technologies for linking information for a particular electronic web site with a phone based application platform, e.g. to provide electronic commerce.

2. Description of the Related Art

The following describes various techniques used in telephone systems to provide enhanced user features. First, telephone identifying information will be discussed. Many telephone systems that support enhanced user features use telephone identifying information as a basic component. Next, a web based state management mechanism will be described. Then, methods of storing state in telephone based applications will be described. Finally, some approaches used on personal computers and web-only environments will be considered.

1. Telephone Identifying Information

The advent of automatic number identification (ANI) and calling number identification (CNID, CLID, or CID) within the North American Numbering Plan (NANP) has supported the creation of a number of services that use these pieces of telephone identifying information. Comparable systems may be used in other numbering plans and countries to support similar services.

For example, when consumers receive credit cards in the mail, they have to call from their home telephone numbers to activate the cards. This is a typical use of ANI. In this instance, the credit card company matches the ANI information provided when the consumer calls to a previously provided telephone number. If the ANI matches the credit card company's records, the credit card company activates the card.

2. Cookies

Cookies are the colloquial term for the "HTTP State Management Mechanism" that as more fully defined in the Internet Engineering Task Force (IETF) Request For Comment (RFC) 2109.

In a similar vein, a modified standard is being developed for proxy state management. See "HTTP Proxy State Management Mechanism" draft proposal to the IETF.

3. Storing State in Telephony Applications

Previous techniques have identified and personalized a user's phone experience through ANI, or other phone-specific device identification information, e.g. telephone identifying information. Alternatively, or in some cases additionally, an explicit user identifier and/or password had to be provided to the application. Then, the individual applications could maintain appropriate state information keyed to that ANI, or user identifier. The state information itself was stored in an application specific, e.g. proprietary, format.

4. Personal Computer-Centric and Web-Centric Solutions

Previous techniques such the keychain from Apple Computer, Inc., Cupertino, Calif. (introduced as a standard feature in the Mac OS(™) operating system version 9, but available earlier as part of Powertalk in version 7), and the features in some Internet browsers to remember passwords, e.g. Internet Explorer(™) from Microsoft Corporation, Redmond, Wash., are personal computer centric. These techniques depend on the interface to the remote web site, e.g. the personal computer, having sufficient input mechanisms as well as data storage to allow users to easily enter and store information for access. In the case of the Apple(™) keychain, the user assigns a single username and password on their computer to unlock stored usernames and passwords for multiple resources, e.g. computer logins, web sites, servers, etc Similarly, with browsers such as Internet Explorer(™), the sign in information you provide a single time may be automatically pre-filled on return visits.

Because most telephone interfaces lack easy mechanisms for input of arbitrary text, e.g. letters and symbols, such systems do not easily translate to a phone based system. Further, even if such a system were adopted, users of a voice portal would face enormous hurdles (time, frustration, different input mechanisms) just providing that usernames and passwords for each site.

Some companies such as Microsoft(™) have attempted to reduce the proliferation of accounts (e.g. usernames and passwords for different sites) by encouraging end users to adopt a single identity for purchasing across multiple web sites, a so called "passport", see <http://www.passport.com/>. The approach is limited because competing "passport" style and wallet systems may need to be supported by a single vendor, which in turn leads to the need to maintain some sort of vendor specific account.

5. Conclusion

Previous techniques are personal computer centric and expect users to easily be able to provide information that is difficult to input over the telephone using standard telephone keypads. Previous approaches do not easily allow the association of telephone identifying information with an account. Previous approaches do not easily allow a single sign on approach based on telephone identifying information to securely unlock access to accounts at multiple entities without the need for the operator of the telephone service to maintain knowledge of the account information.

Accordingly, what is needed is a method and apparatus for providing account linking for telephone applications that can operate in environments with applications provided by multiple legal entities and support multiple users from a single telephone and multiple telephones for a given user, and provide simple mechanisms for linking a web account to a telephone account over the web.

SUMMARY OF THE INVENTION

A method and apparatus for linking a web based account to a phone based account is described. The method avoids the need to directly reveal account information, e.g. username/password, about one account to the provider of the other. The linking occurs on the web in one embodiment, with a user's browser being redirected from the web site to the web site of the provider of the voice service. The redirection URL will include account linking information. Once the user identifies herself to the web site of the provider of the voice service, the linking information can be stored in the user's phone account as a cookie.

When the user accesses the voice service over the phone, her telephone identifying information can be used to identify her profile. When she visits the phone application corresponding to the web site, the cookie—now including linking information—can be passed to the application to identify the appropriate web account.

DETAILED DESCRIPTION

A. Introduction

Figure 1:
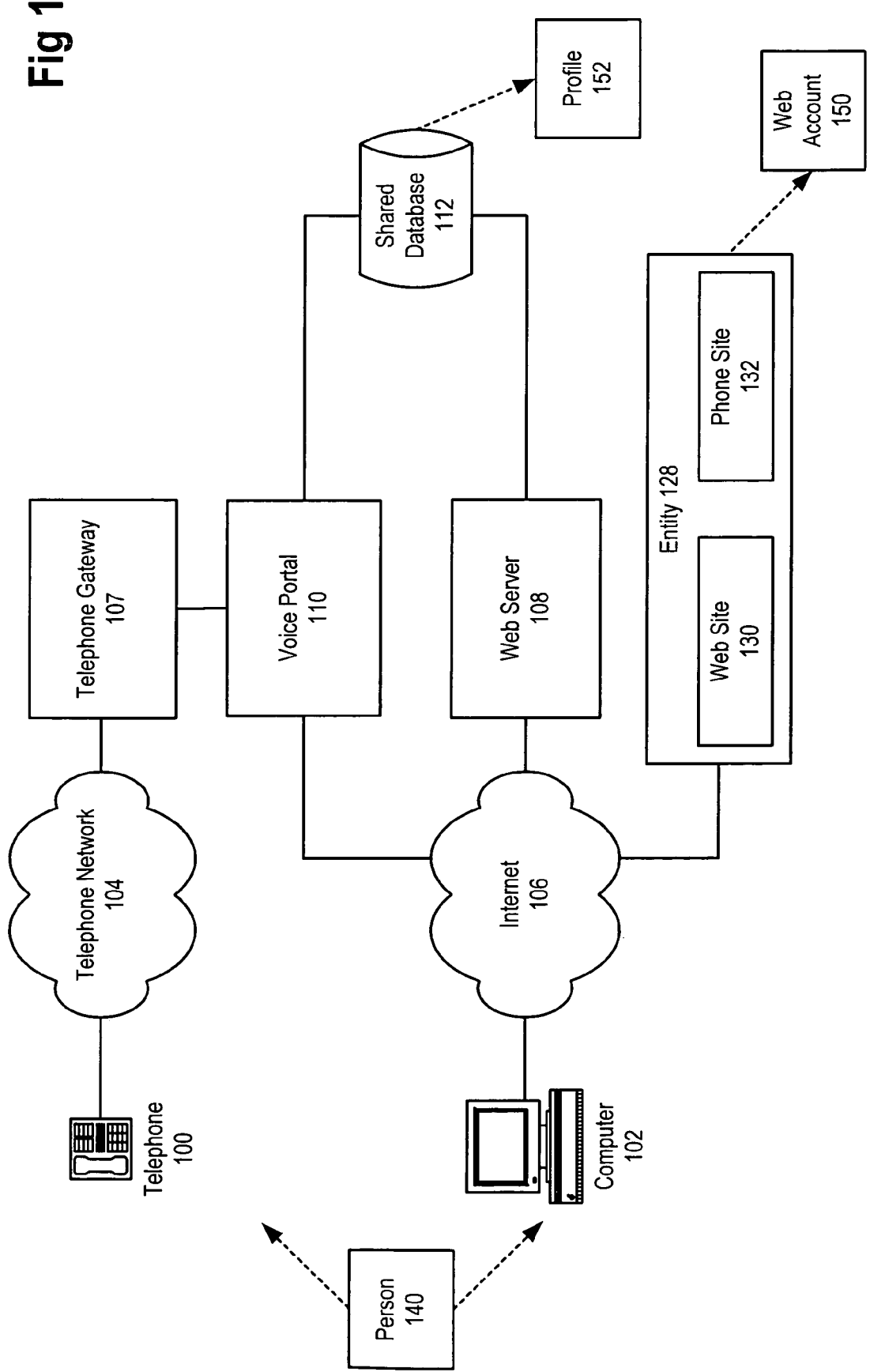
FIG. 1 illustrates a system including embodiments of the invention used to provide personalized content to users of telephones according to telephone identifying information.

A voice portal supporting electronic commerce over a telephone interface is described. The voice portal allows users of telephones, including cellular telephones, to access a voice portal by dialing a phone number to purchase goods and services and interact with applications. The information provided over the voice portal may come from the World Wide Web (WWW), databases, third parties, and/or other sources.

The term voice portal refers to the capability of various embodiments of the invention to provide commerce capabilities over a telephone interface to a caller. Although the invention is described in terms of a voice portal, the techniques described herein can, as appropriate, be applied to a single phone application, which are sometimes called voice applications, phone sites, and/or voice sites. The voice portal can receive dual-tone multi-frequency (DTMF or touch-tone) commands as well as spoken commands to further control the content presented and direct commerce transactions as well as the manner of presentation. The term audio request, or input, is used to refer to either a voice or touch-tone input, or a combination of the two types of input.

Embodiments of the invention use telephone identifying information to personalize caller interactions with the voice portal. This allows the system to present highly customized information to each caller based on a personal profile the system associates with the telephone identifying information.

Additionally, since a single user can access the voice portal from a number of telephones, embodiments of the invention may construct user profiles that allow the telephone identifying information from multiple telephones to be associated with a single user profile.

Further, embodiments of the invention allow applications provided by multiple legal entities can to provide services to users via phone applications hosted on, or through, the voice portal while allowing state information to be stored on a per-user profile basis. Further, embodiments of the invention limit access by an application provided by a first legal entity to access the stored state information set by an application provided by a second legal entity. These features (1) protect user privacy by reducing the need to pass the telephone identifying information among different legal entities; (2) segregate the information a user provides to one legal entity from information provided to another legal entity, e.g. state information provided to Co1 does not get presented to Co2 and vice-versa; and (3) provide for a uniform interface for application programmers to store state information in their voice portal applications.

The invention will be described in greater detail as follows. First, a number of definitions useful to understanding the invention are presented.

B. Definitions

1. Telephone Identifying Information

For the purposes of this application, the term telephone identifying information will be used to refer to ANI information, CID information, and/or some other technique for automatically identifying the source of a call and/or other call setup information. For example, telephone identifying information may include a dialed number identification service (DNIS). Similarly, CID information may include text data including the subscriber's name and/or address, e.g. "Jane Doe". Other examples of telephone identifying information might include the type of calling phone, e.g. cellular, pay phone, and/or hospital phone.

Additionally, the telephone identifying information may include wireless carrier specific identifying information, e.g. location of wireless phone now, etc. Also, signaling system seven (SS7) information may be included in the telephone identifying information.

2. User Profile

A user profile is a collection of information about a particular user. The user profile typically includes collections of different information. Notably, the user profile contains a combination of explicitly made selections and implicitly made selections Explicitly made selections in the user profile stem from requests by the user to the system. For example, the user might add business news to the main topic list. Typically, explicit selections come in the form of a voice, or touch-tone command, to save a particular location, e.g. "Remember this", "Bookmark it", "shortcut this", pound (#) key touch-tone, etc., or through adjustments to the user profile made through the web interface using a computer.

Additionally, the user profile provides a useful mechanism for associating telephone identifying information with a single user, or entity. For example, Jane Doe may have a home phone, a work phone, a cell phone, and/or some other telephones. Suitable telephone identifying information for each of those phones can be associated in a single profile for Jane. This allows the system to provide uniformity of customization to a single user, irrespective of where they are calling from.

In contrast, implicit selections come about through the conduct and behavior of the user. For example, if the user repeatedly asks for the weather in Palo Alto, Calif., the system may automatically provide the Palo Alto weather report without further prompting. In other embodiments, the user may be prompted to confirm the system's implicit choice, e.g. the system might prompt the user "Would you like me to include Palo Alto in the standard weather report from now on?"

Additionally, the system may allow the user to customize the system to meet her/his needs better. For example, the user may be allowed to control the verbosity of prompts, the dialect used, and/or other settings for the system. These customizations can be made either explicitly or implicitly. For example if the user is providing commands before most prompts are finished, the system could recognize that a less verbose set of prompts is needed and implicitly set the user's prompting preference to briefer prompts.

3. Topics and Content

A topic is any collection of similar content. Topics may be arranged hierarchically as well. For example, a topic might be business news, while subtopics might include stock quotes, market report, and analyst reports. Within a topic different types of content are available. For example, in the stock quotes subtopic, the content might include stock quotes. The distinction between topics and the content within the topics is primarily one of degree in that each topic, or subtopic, will usually contain several pieces of content.

4. Cookie

The term cookie, as used herein, refers to a structured data element formatted according to the general principles of IETF RFC 2109 and/or some other state management standard.

A brief review of RFC 2109 may be useful. The core structure of a cookie is a name-value pair. The name is a token for identifying the cookie, e.g. "Customer", and the value is the value of that corresponding token, e.g. "Jane Doe".

Implicitly, each cookie is associated with the sending domain. According to RFC 2109, the implicitly set domain is the originating domain to which the HTTP request was sent. For example, if an HTTP GET request is sent to the request host "www.example.com", then the cookie set in response to that request would be implicitly associated with "www.example.com"

Additionally, a number of optional fields can be set, for example: a different domain for which the cookie is valid (Domain); a time to live (Max-Age); a version string (Version); etc. The phrases in parenthesis correspond to the RFC 2109 standard field names for the options.

5. Demographic and Psychographic Profiles

Both demographic profiles and psychographic profiles contain information relating to a user. Demographic profiles typically include factual information, e.g. age, gender, marital status, income, etc. Psychographic profiles typically include information about behaviors, e.g. fin loving, analytical, compassionate, fast reader, slow reader, etc. As used in this application, the term demographic profile will be used to refer to both demographic and psychographic profiles.

C. System Architecture

The invention will be described with reference to FIGS. 1–3. First FIG. 1 will be described generally, then the use of the elements of FIG. 1 to link a web based account with a phone based account is described in connection with FIG. 2. Lastly, the process of using the linked account will be described with reference to FIG. 3.

FIG. 1 illustrates a system including embodiments of the invention used to provide personalized content to users of telephones according to telephone identifying information. This could be used to support access to Internet based information from various entities over the telephone.

This paragraph lists the elements of FIG. 1 and describes their interconnections. FIG. 1 includes a telephone 100, a computer 102, a telephone network 104, the Internet 106, a telephone gateway 107, a web server 108, a voice portal 110, a shared database 112, and an entity 128. The entity 128 comprises a web site 130 and a phone site 132. A person 140 is shown using the telephone 100 and the computer 102. The entity 128 further includes a web account 150 (for the person 140). Similarly, the shared database includes a profile 152 (for the person 140).

First, the hardware and software architecture of a system including an embodiment of the invention will be described with reference to FIGS. 1–2. FIG. 1 illustrates a system including embodiments of the invention used to provide personalized content to users of telephones according to telephone identifying information. The system of FIG. 1 can be used to allow users of standard telephones and cellular telephones to access a voice portal with personalized content from their telephones.

The following lists the elements of FIG. 1 and describes their interconnections. FIG. 1 includes a telephone 100, a cellular telephone 101, a computer 102, a telephone network 104, an Internet 106, a telephone gateway 107, a web server 108, a voice portal 110, a shared database 112 and a personalized site 130. The cellular telephone 101 and the telephone 100 are coupled in communication with the telephone network 104. The telephone network 104 is coupled in communication with the telephone gateway 107. The telephone gateway 107 is coupled in communication with the voice portal 110. The computer 102 is coupled in communication with the Internet 106. The Internet 106 is coupled in communication with the web server 108. The voice portal 110 and the web server 108 are coupled in communication with the shared database 112. The personalized site 130 is coupled in communication with the Internet 106.

The following describes each of the elements of FIG. 1 in greater detail. The use of each of the elements will be described further in conjunction with the sections describing the linking features.

The telephone 100 is a telephone interfaces to the voice portal 110. The telephone 100 may be any sort of telephone and/or wireless telephone. For example the telephone 100 may be a land line phone, a PBX telephone, a satellite phone, a wireless telephone, and/or any other type of communication device capable of providing voice communication and/or touch-tone signals over the telephone network 104. However, any audio signal carrying interface could be used.

The telephone network 104 may be the public switched telephone network (PSTN) and/or some other type of telephone network. For example, some embodiments of the invention may allow users with a voice over Internet Protocol (IP) phone to access the voice portal 110. In the case of voice over IP (VoIP) access, the telephone identifying information may include any information included with the session setup, e.g. IP addresses, header fields, initiator's e-mail address, etc. The telephone network 104 is coupled to the telephone gateway 107 that allows the voice communications and/or touch-tone signals from the telephone network 104 to reach the voice portal 110 in usable form. Similarly, the telephone gateway 107 allows audio signals generated by the voice portal 110 to be sent over the telephone network 104 to respective telephones, e.g. the telephone 100. The telephone network 104 generally represents an audio signal carrying network.

The computer 102 is a computer such as a personal computer, a thin client computer, a server computer, a handheld computer, a set top box computer, and/or some other type of visual web browsing device. The computer 102 is coupled in communication with the Internet 106, e.g. by a dial-up connection, a digital subscriber loop (DSL), a cable modem, and/or some other type of connection. This allows the computer 102 to communicate with the web server 108. The computer 102 typically provides a visual interface to the WWW and the web server 108 using web browsing software such as Internet Explorer(™) from Microsoft Corporation, Redmond, Wash.

In this example, both the telephone 100 and the computer 102 can be operated at the direction of a single individual, e.g. the person 140. Who may use the computer 102 for types of Internet access and services and use the telephone 100 in connection with the voice portal 110 for others.

Both the web server 108 and the voice portal 110 are capable of communicating with the shared database 112 to register users and build profiles, e.g. the profile 152 for the person 140. The database 112 stores profiles for each user based on an association between one or more pieces of telephone identifying information and a particular user. Thus, the database may have a profile for a user Sarah Smith that is keyed to her home telephone number, e.g. 650-493-####. Additionally, Sarah could associate other numbers, e.g. work, cellular, etc., with her profile either implicitly, e.g. by repeatedly calling the voice portal 110 from those numbers, or explicitly, e.g. by adding those numbers to the system directly.

The entity 128 most generally represents one or more individuals, businesses, legal entities, and/or other entities, that operate over the Internet 106, e.g. by providing a web site such as the web site 130. The operated web site 130 may be informational and/or commerce based. In this example, the entity 128 will be an online merchant that operates the web site 130 at the uniform resource locator (URL)<http://www.onlinemerchant.com/>. Consumers, such as the person 140, who visit the entity's web site to make purchases may create online accounts, e.g. the web account 150; frequently using a username-password style form of identification. In this example, the entity 128 will also be establishing a phone site (e.g. the phone site 132) comprising one or more programs for presentation over a voice portal (e.g. the voice portal 110) to telephone based users. The entity 128 can establish its web site 130 and phone site 132 using one or more available computer systems and programs for supporting the same. According to some embodiments of the invention, the programs for the phone site 132 can be hosted on one or more standard hypertext transfer protocol (HTTP) servers for access by the voice portal 110 over the Internet 106.

D. Linking a Web Account to a Phone Account

Figure 2:
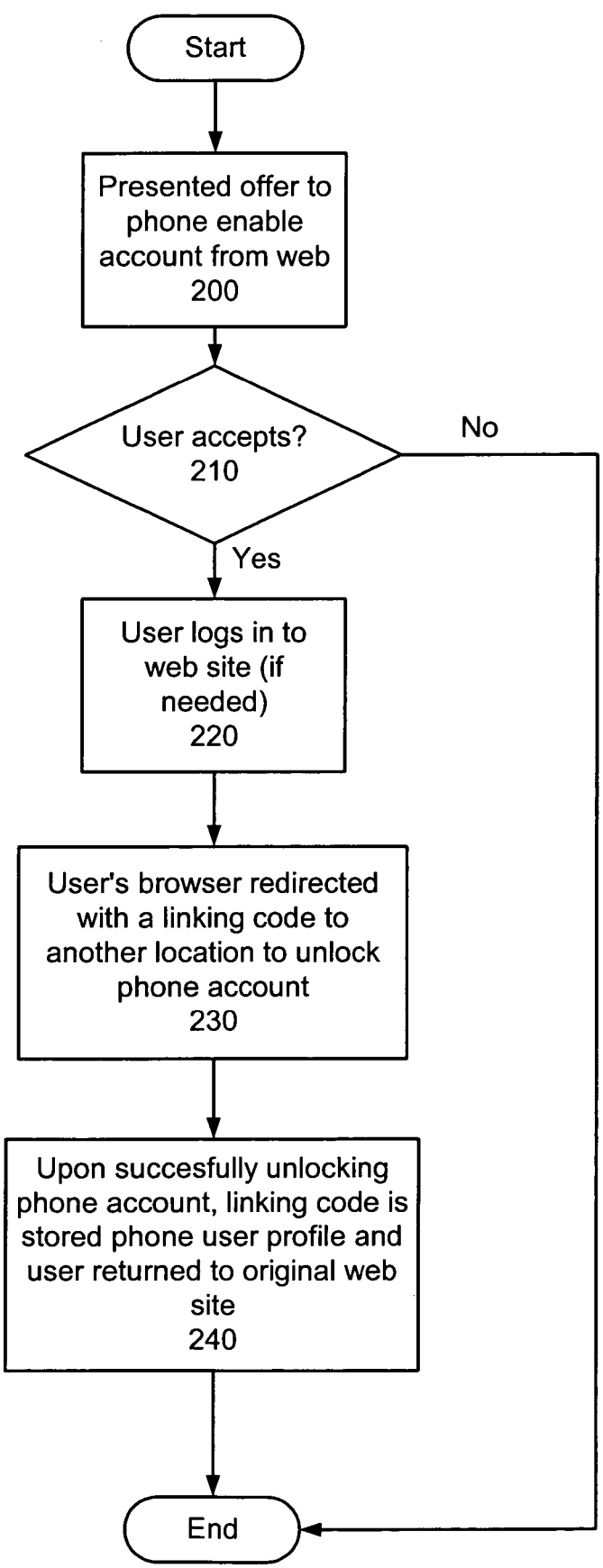
FIG. 2 is a process flow diagram for linking a web based account with a phone account over the world wide web.

The process of linking a web based account (e.g. the web account 150) to a phone account (e.g. the profile 152) will now be considered in conjunction with FIG. 2. This process can be used by users to link a web based account with their phone based (voice portal) account over the web. This process also is privacy protecting of user information by allowing the user to link the two accounts without giving out her/his username/password for one service to the other.

The process starts at step 200, when a user (e.g. the person 140) navigates to a web site (e.g. the web site 130) with her/his computer 102. One or more of the web pages presented on the display of the computer 102 may offer to "phone" enable the user's account. Continuing the above example, if the entity 128 is an online merchant a banner ad or text might invite the user to "Click here to phone enable your account for access from Tellme", "Want to place orders by phone? Click here to sign up.", etc.

Next, at step 210, if the user accepts the offer, e.g. by following the link, the process will continue at step 220. Otherwise, the process of FIG. 2 ends, but the user remains free to navigate the web site 130. Other offers to link the accounts would restart the process at step 200.

Continuing, at step 220, the user is requested to log in to the web site, if necessary. In many cases, web sites use cookies and other technologies to reduce the need for users to repeatedly log in to their accounts. Importantly for this process, from a privacy perspective, is that the user provides information about her/his web account only to the entity 128 that operates the web account. Some embodiments of the invention may omit step 220 in its entirety with process flowing from step 210 directly to step 230. These embodiments would occur if the offers of step 200 are only presented to users that are currently signed in to the web site.

Next, at step 230, the user's browser is redirected to another location (e.g. on the web server 108 of the operator of the voice portal 110) with a linking code. In many instances the new location will be a co-branded web site including one or more graphical elements to match the appearance of the web site 130. An example will make this clearer.

For example, if the voice portal 110 operates the web server 108 on the URL "voiceportal.com", a co-branded site might be identified using a special name, e.g. "merchant.voiceportal.com", or from the HTTP referrer information. In this example, the use of a co-branded site for phone login is not required, but may be useful for improving the user experience.

Continuing the example, the redirection will be to "merchant.voiceportal.com" and several arguments will be passed including:

a linking code, or linking handle, which is an arbitrary string generated by the entity 128 to uniquely identify the web account 150 and a return URL, which identifies what page on the web site 130 to send the user to after the linking code is associated with the user's phone account.

So more generally, the URL will look like

"{cobrandname}.voiceportal.com/?link={linking code}&return={return url}"

Notice that in this example the HTTPS protocol (e.g. HTTP over secure sockets layer (SSL), now also called transport layer security (TLS)) is used.

Once the user's computer 102 browses to the new location, the user is prompted, e.g. by a fillable hypertext markup language (HTML) form, to enter the information for their phone account (e.g. phone number and pin).

Note that if the web site 108 has already stored an identifying cookie with the user's web browser (e.g. on their computer 102), it may be unnecessary for the user to take any direct action to unlock their phone account. The user's web browser would visit the web new location, the cookie in the user's web browser would identify the user to the voice portal and the linking code could then be stored and the user sent back to the return URL without any user actions aside from the initial click. According to one preferred embodiment, the voice portal 110 (via its web server 108) stores one or more identifying cookies on the computer 102 of the person 140 to eliminate the need for a manual log in as part of step 230. This supports single action (or "one click") account linking as users need only perform a single direct action, e.g. click their mouse, to link their web account to their phone account (this assumed that offers of step 200 are only presented to users logged into the web site 130).

Finally, at step 240, when the user successfully enters that information, the linking code can be stored in a cookie within the profile 152. The cookie name can be standardized, e.g. LINK_COOKIE, and the domain for the cookie can be set based on the return URL provided. Once the LINK_COOKIE is stored, the browser on the user's computer 102 can be redirected to the return URL provided, e.g. sent back to an appropriate location within the web site 130. The user's web account for the entity 128 is now configured for access via the phone.

E. Using the Linked Account

Figure 3:
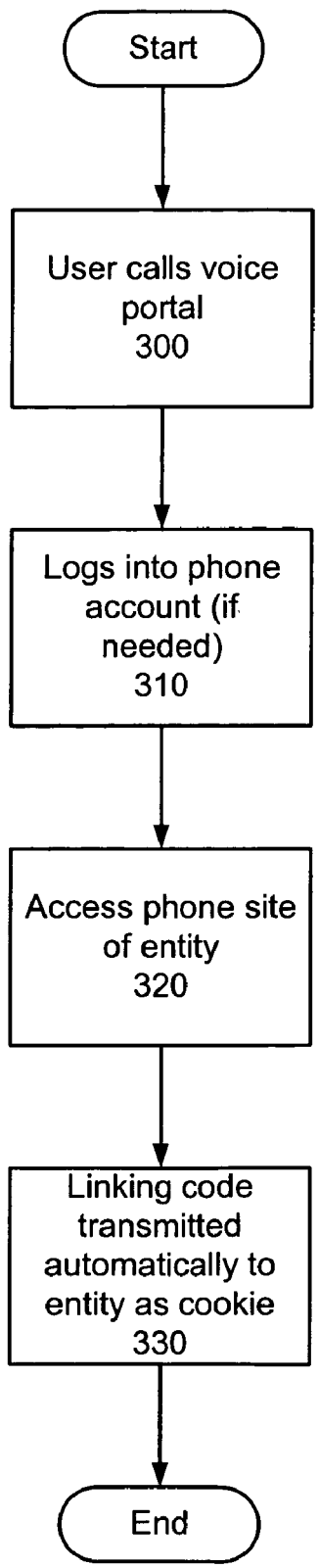
FIG. 3 is a process flow diagram using a linked account from a telephone interface.

The process of using the linked web account (e.g. the web account 150) from the voice portal 110 will now be considered in conjunction with FIG. 3. This process can be used by users of the voice portal to more rapidly access customized features of phone sites of associated with merchants previously linked over the web, e.g. by the process of FIG. 2. Like that process, this process is privacy protecting of user information by allowing the user to access to the linked account without giving her/his username/password for one service to the other.

The process starts at step 300 where a user (e.g. the person 140) calls a voice portal (e.g. the voice portal 110) using a telephone (e.g. the telephone 100). Frequently, this is accomplished by dialing the phone number of the voice portal, e.g. 800-555-####.

Next, at step 310, the user identifies herself/himself to the voice portal 110, and thus unlocking her/his profile, e.g. the profile 152. See below for a discussion of the use of telephone identifying information and identifying users. According to some embodiments of the invention, identified users are not required to explicitly provide both their username (e.g. sign in telephone number) and password (e.g. spoken phrase or PIN) to the voice portal 110, if they can be adequately identified using telephone identifying information.

Next, at step 320, the user accesses the phone 132 of the entity 128. This may be accomplished by spoken and/or dual-tone multi-frequency (DTMF) commands that cause the voice portal 110 to begin execution of one or more programs from the phone site 132. In some embodiments of the invention, the order of steps 310 and 320 can be swapped. In still other embodiments, step 310 is invoked automatically by the voice portal 110 in response to a request for a linking code by a phone site when the user has not been logged into the voice portal 110.

Finally, at step 330, the linking code is transmitted to the entity 128 as a part of one or more standard HTTP requests.

This account linking approach provides simple yet flexible access and eliminates the need to store actual username/password combinations. Some uses for embodiments of the invention include: using linking codes to link existing wallet systems, e.g. Microsoft Passport, to a phone account; using linking codes to permit sign in to instant messenger services such as Instant Messenger(™) from America Online, Dulles, Va.; and using linking codes to access Internet based mailboxes. Such uses may require suitable modifications to the recipient programs/services to support account linking.

F. Wallet and Commerce Features

Additionally, some embodiments of the invention further support electronic commerce wallet features. Electronic commerce wallets reduce data collection time and cost by allowing consumers to easily pay for goods and services electronically without having to reenter shipping and billing information, for example. The value of a wallet in an voice environment is somewhat higher given the limited input modalities and the restrictions of present day speech recognition. Accordingly, some embodiments of a voice portal may include wallet features.

The account linking approach can be extended to allow sharing of wallet information, or other personal information, from a web site to the operator of a voice portal. In the linking process of FIG. 2, a wallet indicator can be provided together with the linking code and return URL, e.g. wallet=true, or wallet=partial, or wallet=complete, etc. The content of the strings can be agreed to. One embodiment uses the values complete and partial where a partial wallet includes: credit card number, expiration data, and billing address; whereas a complete wallet also includes a full name. Further, a URL for accessing the wallet information may be provided, e.g. "walletur= . . . ". In some embodiments, the presence of a wallet URL is sufficient to indicate that some sort of wallet is present.

The use of the linked wallet proceeds as follows. When a user on the voice portal accesses one or more services that require payment, the voice portal 110 can prompt the user to first identify herself/himself (if needed), and then provide payment information. If the user does not have a wallet, the voice portal 110 can scan all of the available accounts that have been linked for wallets. If a wallet is found, the user can be prompted for permission to use the wallet (in some embodiments, the use is automatic) and by accessing the provided wallet URL, the appropriate information can be transferred for billing.

In order to encourage this business model, one or more fees may be shared or levied. For example, the operator of the voice portal may have a range of charges for use of a phone based wallet and then: (a) share a percentage of the received fees with the provider of the wallet information and/or (b) provide discounts on use of the voice portal wallet. For example, in one embodiment, a fee is charged for first access to a voice portal wallet and a different, lower, charge is assessed for subsequent accesses by the same merchant. In one embodiment the charges are on the order of $0.30–$1.00 for initial accesses with repeat access charged at a nominal amount, e.g. $0.00–$0.10. If sharing is used, the sharing party might receive a share credit of $0.01–$1.00, or more, depending on the cost of creating a wallet (currently estimated at approximately $1.00 for a complete wallet). The cost estimate assumes that in some instances human operators may be used to collect necessary data.

G. Miscellaneous

How Identified is the User?

Some embodiments of the invention track different levels of confidence indicating the extent to which a user has been fully identified. For example, if multiple members of a household use the service with different profiles, it may be difficult to immediately select the appropriate profile.

Some embodiments of the invention track this as an identification level selected from the set:

Unknown: The system could not obtain telephone identifying information or was unable to process telephone identifying information appropriately. At this level, persistent cookies are unavailable and will be deleted at the end of the session.

Anonymous: The system could not identify a unique user from the telephone identifying information, e.g. multiple users may share this phone. At this level, persistent cookies are unavailable and will be deleted at the end of the session.

Identified: The system has identified a single user profile using only the telephone identifying information—however no password has been received. Persistent cookies are made available. Also, user profile information may be accessed from within the application through appropriate variables, e.g. {user.*}.

Verified: The system has identified a single user profile and confirmed the identity, e.g. with a password, voice login, and/or other authentication method. Persistent cookies are made available. Also, user profile information may be accessed as for identified users.

The specific user level can be made known to the remote application in a number of different fashions. For example, the integers 0 through 3 can correspond to each of the above levels and be stored in a session variable, e.g. {session. id_level}, available to all applications.

A variety of implementation specific choices can then be made on a platform wide and on a per-application basis. For example, according to some embodiments of the invention, applications are not provided state information for a particular user unless the confidence exceeds a predetermined threshold, e.g. identified or verified.

In this situation, a temporary profile can be created to hold state during a particular telephone call. Alternatively, the caller can be asked to better identify herself/himself to the system. Still other embodiments allow applications to decide whether to request further authentication, e.g. the particular phone application could request that a user be verified, etc.

The confidence information could also be provided in the form of a designated cookie having appropriate access rights for applications, e.g. "Confidence=<value>", in a request header, and/or in a suitable programming language construct.

In some embodiments of the invention, phone based linking (e.g. sign in step of 310) is required unless user is "identified" or "verified". In still other embodiments, only "verified" users are not asked to sign in at step 310.

Security Concerns

Some useful security suggestions (one or more of which may be adopted by particular entities and/or voice portal operators):

1. Configure the voice portal to use a secure protocol to communicate with the phone site programs, e.g. HTTP over SSL/TLS, better known as HTTPS.
2. Configure the web server providing the phone site 132 over HTTP to only respond to requests from the voice portal 110.
3. Configure the generation of linking codes to implicitly time out (e.g. one week, one month, one year, etc.) and only accept linking codes that have not already expired. (This recommendation leads to a preference for setting a new linking code within the phone site 132 during the access to reduce the chance that the user's linking code from expiring and increase security.)
4. Generate the linking codes in a secure fashion, e.g. using encryption, random numbers, etc., to reduce the ability to "guess" a linking code from known data about the user's web account.
5. Generate the linking codes so that the code generated for a given account will change over time.
6. Perform a double check in the phone site 132, e.g. by asking for a short string the user would know, e.g. month/year of birth already in the web account, or a secondary password, etc. (This might be most desirable for more security conscious sites to provide a type of double verification against hijacked phone accounts. One example use, allow users access to information without additional verification, but require a separate trading PIN for transactions.)
7. As in 6, above, but have the user key their password using a single telephone key (DTMF) for each letter/ number in their password; that sequence can be securely transmitted to the remote site as a string of numbers and compared remotely against the password in such form, e.g. if the web site maintains a clear text version of the password suitable to translate into DTMF sequence for comparison. (This is desirable to reduce the number of distinct passwords that a user would have to associate with a given web site.)
8. Configure the voice portal web server to return the linking number as part of the redirection back to the return URL, e.g. if the return URL is R and the linking code is L, when returning to URL R, add L as an argument. Then have the entity only accept link codes from the voice portal that were so returned. (Reduces likelihood of spoofed linking codes being stored in voice portal profiles by way of a rogue site and/or rogue voice portal operator.)

It is unlikely that all of these suggestions will be necessary in every situation; however, the specific ones supported by the operator of the voice portal 110 can be selected based on the needs of the one or more entities for which account linking is supported.

H. Conclusion

A web-to-phone account linking mechanism has been described that is privacy preserving for users (e.g. different legal entities cannot access usernames and passwords of another entity and telephone identifying information is kept confidential to the voice portal 110) and is uniform for application developers (a single linking mechanism is available for phone application development).

The phone state management mechanism can be integrated with personalization features provided by embodiments of the invention have been described, those features can be combined in a number of ways to provide personalized commerce services.

In some embodiments, voice portal 110 can be hardware based, software based, or a combination of the two. In some embodiments, voice portal 110 and/or the phone application state management mechanism are comprised of one or more computer programs that are included in one or more computer usable media such as CD-ROMs, floppy disks, or other media. In some embodiments, call manager programs, execution engine programs, data connectivity engine programs, evaluation engine programs, streaming subsystem programs, recognition server programs, text to speech programs and/or phone application state management mechanisms are included in one or more computer usable media.

Some embodiments of the invention are included in an electromagnetic wave form. The electromagnetic waveform comprises information such as call manager programs, execution engine programs, data connectivity engine programs, evaluation engine programs, streaming subsystem programs, recognition server programs, text to speech programs and/or phone application state management mechanisms. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of linking a web based account to a phone based account over the world wide web (WWW), the method comprising:

receiving a connection request from a first computer on a second computer, the connection request formatted as a uniform resource locator (URL), the URL further specifying a linking code and a return location, the linking code corresponding to an identifier provided by a third computer to the first computer and identifying the web based account on the third computer;

responsive to one or more messages between the first computer and the second computer, identifying the phone based account; and storing the linking code in the phone based account as a cookie.

2. The method of claim 1, wherein the return location comprises a URL, the method further comprising sending a message from the second computer to the first computer, the message instructing the first computer to send a connection request to a computer identified by the URL in the return location.

3. The method of claim 1, wherein the method occurs entirely in response to a single action.

4. The method of claim 3, wherein the single action comprises a mouse click.

5. The method of claim 1, wherein the first computer comprises a computer operated by an individual and the second computer operated by a legal entity that supports access to the phone based account for the individual via a telephone interface.

6. The method of claim 1, wherein the second computer and third computer are operated by different legal entities.

7. The method of claim 1, wherein the URL formatted in the connection request further includes a wallet indicator, the wallet indicator provided by the third computer and indicating that the third computer will share commerce related information relating to the web account with the second computer.

8. The method of claim 1, wherein the return location comprises a URL and the cookie is stored in the phone based account with a predetermined name, the value of the linking code and the domain of the return location.

9. A method of accessing a web based account over a telephone interface using telephone identifying information and a first computer, the method comprising:

identifying a phone account using the first computer and the telephone identifying information;

selecting a state associated with the phone account using the first computer, the state comprising a plurality of cookies; and automatically providing a subset of the plurality of cookies to the application using the first computer, the providing responsive to receiving a request over the telephone interface to initiate an application on a second computer, wherein the subset of the plurality of cookies includes at least one cookie including a linking code, the linking code identifying a web account to the second computer.

10. The method of claim 9, wherein the automatically providing occurs over a communication channel encrypted according to one or more of a secure sockets layer (SSL) protocol and a transport layer security (TLS) protocol.

11. The method of claim 9, further comprising automatically removing the at least one cookie including the linking code from the plurality of cookies after the automatically providing.

12. The method of claim 9, wherein responsive to receiving the at least one cookie including the linking code, the application capable of accessing information associated with the related web account.

13. The method of claim 9, wherein subsequent to receiving the at least one cookie including the linking code, the application receives a string, the string corresponding to single key DTMF sequence of a password for the related web account, and wherein the application capable of accessing information associated with the related web account using the string.

14. An apparatus for linking a web based account to a phone based account over the world wide web (WWW), the apparatus comprising:

means for receiving a connection request from a first computer, the connection request formatted as a uniform resource locator (URL), the URL further specifying a linking code and a return location, the linking code corresponding to an identifier provided by a third computer to the first computer and identifying the web based account on the third computer;

means for communicating with the first computer to identify the phone based account; and means for storing the linking code in the phone based account as a cookie.

15. A method of obtaining a customer information over a telephone interface using telephone identifying information and a first computer, the method comprising:

identifying a phone account using the first computer and the telephone identifying information;

selecting a state associated with the phone account using the first computer, the state comprising a plurality of cookies;

selecting at least one of the plurality of cookies comprising a wallet indicator, the wallet indicator comprising an URL for obtaining customer information in a web account from a second computer; and using the URL to obtain the customer information from the second computer.

16. The method of claim 15, wherein responsive to using the URL, a predetermined amount is paid by the operator of the first computer to the operator of the second computer.

17. The method of claim 15, wherein there is at least one of the plurality of cookies comprising a linking code and wherein using the URL further comprises sending a hypertext transfer protocol (HTTP) request to the URL that includes the linking code and receiving back the customer information.

* * * * *